United States Patent
Kim et al.

(10) Patent No.: US 12,525,600 B2
(45) Date of Patent: Jan. 13, 2026

(54) FLOW RATE CONTROL APPARATUS AND METHOD FOR COATING MULTI-DIVISION DUAL LAYERS

(71) Applicant: SAMSUNG SDI CO., LTD., Yongin-si (KR)

(72) Inventors: Gi Sung Kim, Suwon-si (KR); So Hun Kim, Suwon-si (KR); Won Sub Seo, Suwon-si (KR); Jin Seo Park, Suwon-si (KR); Young Hak Pyo, Suwon-si (KR); Byoung Kuk Kim, Suwon-si (KR); Seung Hak Lee, Suwon-si (KR); Rae Joon Jung, Suwon-si (KR); Kyung Taek Choi, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 35 days.

(21) Appl. No.: 18/618,888

(22) Filed: Mar. 27, 2024

(65) Prior Publication Data

US 2025/0183248 A1    Jun. 5, 2025

(30) Foreign Application Priority Data

Dec. 1, 2023 (KR) .......................... 10-2023-0172413

(51) Int. Cl.
*H01M 4/04* (2006.01)
*B05B 12/00* (2018.01)
*B05B 12/08* (2006.01)

(52) U.S. Cl.
CPC ......... *H01M 4/0404* (2013.01); *B05B 12/006* (2013.01); *B05B 12/085* (2013.01)

(58) Field of Classification Search
CPC .............................. B05C 5/027; B05C 5/0254
See application file for complete search history.

(56) References Cited

U.S. PATENT DOCUMENTS

| | | |
|---|---|---|
| 2003/0140849 A1 | 7/2003 | Kawabe |
| 2015/0165472 A1 | 6/2015 | Komatsubara et al. |
| 2019/0232309 A1 | 8/2019 | Saine et al. |
| 2019/0374971 A1 | 12/2019 | Horinouchi et al. |
| 2023/0061304 A1 | 3/2023 | Sato et al. |

FOREIGN PATENT DOCUMENTS

| | | |
|---|---|---|
| CN | 115780175 A | 3/2023 |
| EP | 4 119 240 A1 | 1/2023 |
| JP | 2013-140680 A | 7/2013 |

OTHER PUBLICATIONS

Extended European Search Report issued in corresponding EP Application No. 24174819.3, dated Dec. 16, 2024, 9 pages.

*Primary Examiner* — Austin Murata

(74) *Attorney, Agent, or Firm* — Womble Bond Dickinson (US) LLP

(57) ABSTRACT

A flow rate control apparatus for coating multi-division dual layers, including a plurality of slot dies organized into an upper layer and a lower layer, and configured to coat an electrode with a slurry; a pump configured to supply the slurry from a tank to each of the upper layer and the lower layer; a valve at the plurality of slot dies, and configured to divide the slurry supplied from the pump, and to supply the divided slurry to the plurality of slot dies; a flowmeter configured to measure a flow rate of the slurry supplied to the plurality of slot dies; and a processor configured to control the pump and the valve based on the flow rate of the slurry measured by the flowmeter to control a coating amount of the electrode.

20 Claims, 12 Drawing Sheets

FIG. 7

| FLOW RATE AVERAGE IN MOVING DIRECTION − TARGET FLOW RATE | AMOUNT OF CHANGE IN RPM OF PUMP |
|---|---|
| $\Delta > +l\ \mu m$ | $-L$ rpm |
| $+k\ \mu m < \Delta < +l\ \mu m$ | $-K$ rpm |
| $+j\ \mu m < \Delta < +k\ \mu m$ | $-J$ rpm |
| $-i\ \mu m < \Delta < +j\ \mu m$ | $0$ rpm |
| $-h\ \mu m < \Delta < -i$ | $+I$ rpm |
| $-g\ \mu m < \Delta < -h$ | $+H$ rpm |
| $-g\ \mu m > \Delta$ | $+G$ rpm |

FIG. 8

| FLOW RATE TOTAL AVERAGE − FLOW RATE FOR EACH ROW = DISPERSION | VALVE OPEN AMOUNT |
|---|---|
| DISPERSION > +f μm | −F μm |
| +e μm < DISPERSION < +f μm | −E μm |
| +d μm < DISPERSION < +e μm | −D μm |
| −c μm < DISPERSION < +d μm | 0 μm |
| −b μm < DISPERSION < −c μm | +C μm |
| −a μm < DISPERSION < −b μm | +B μm |
| −a μm > DISPERSION | +A μm |

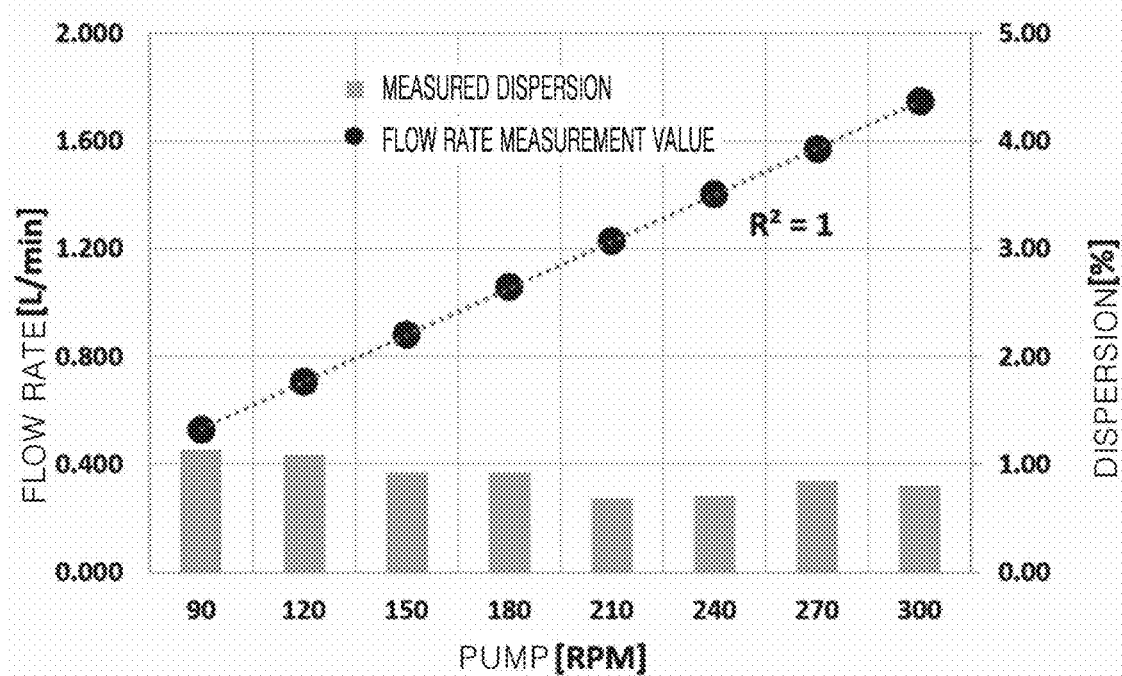

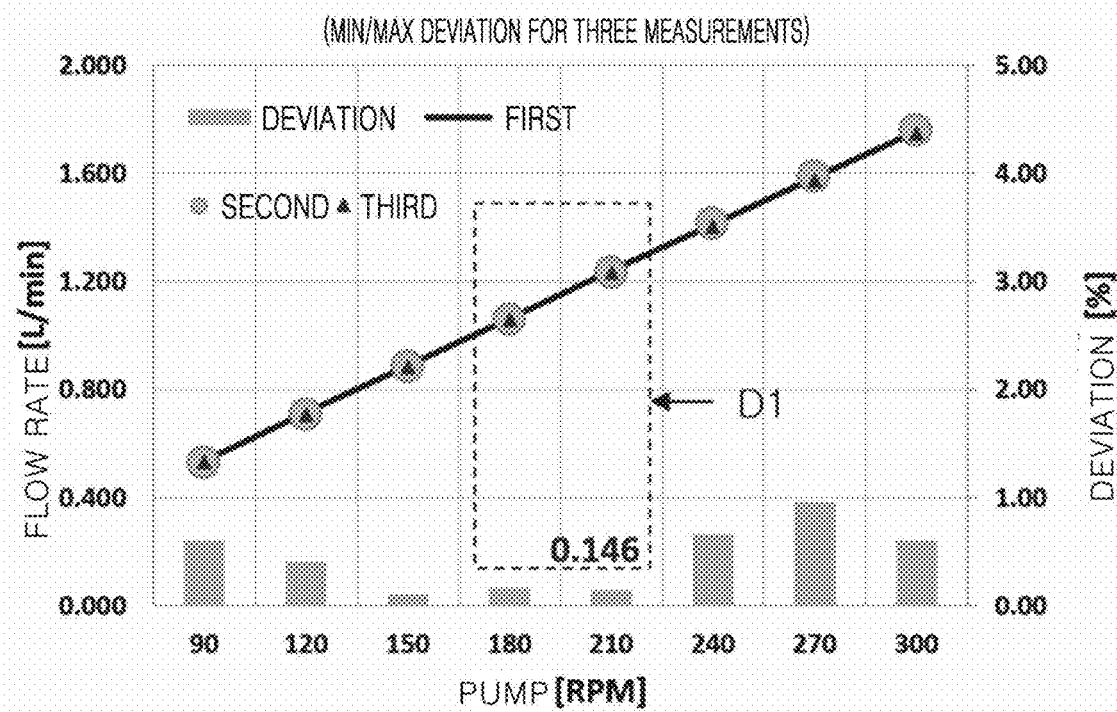

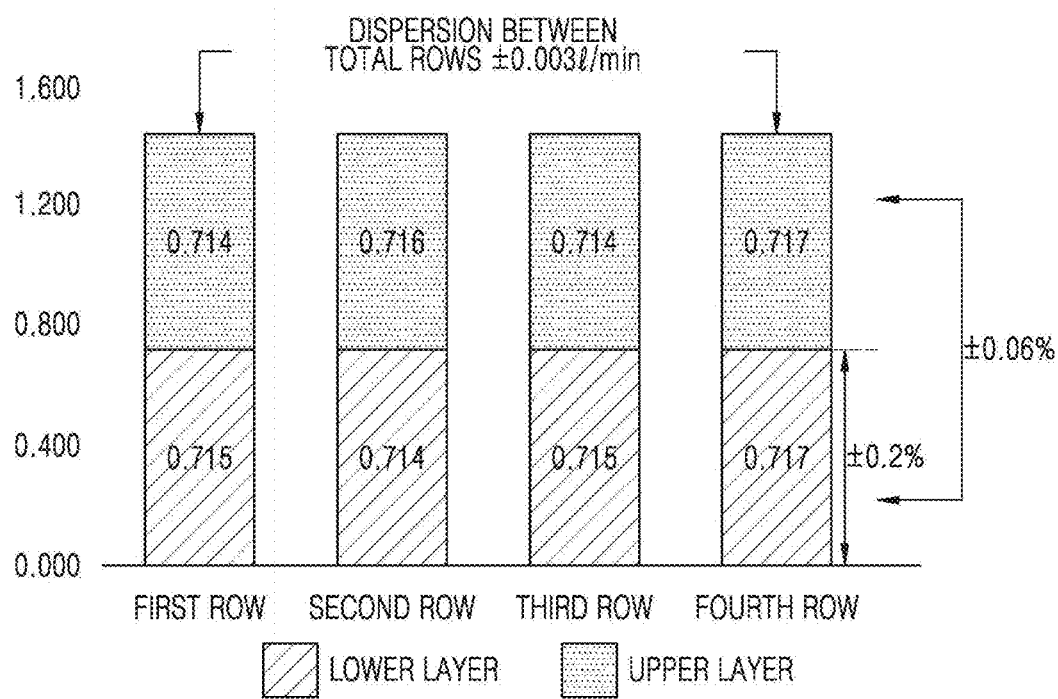

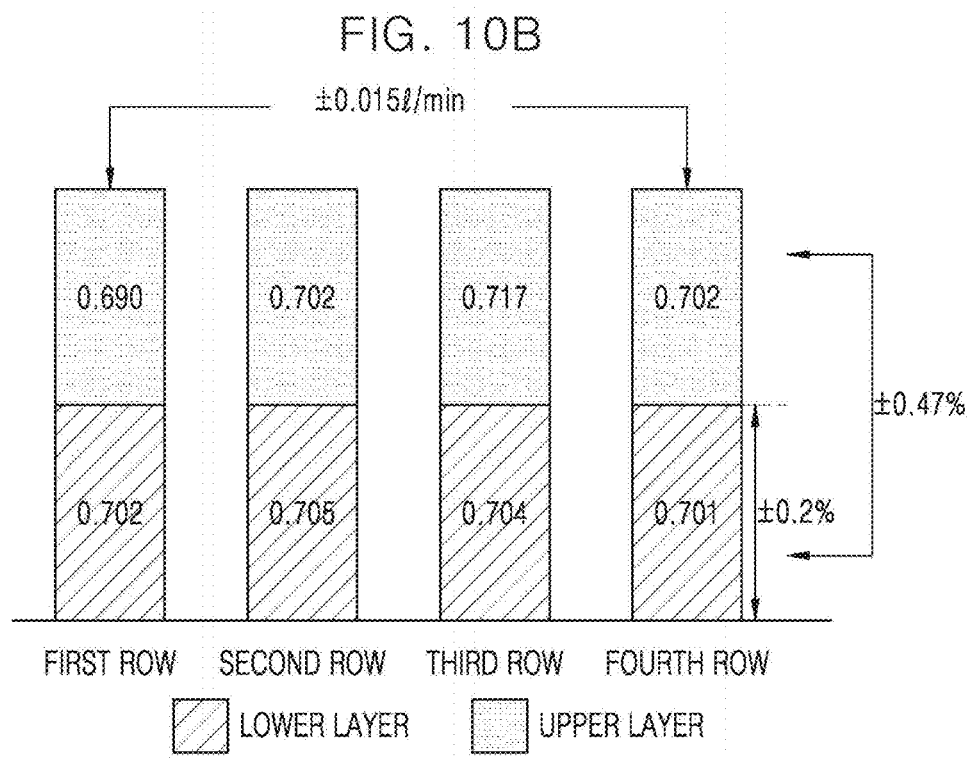

FLOW RATE CONTROL APPARATUS AND METHOD FOR COATING MULTI-DIVISION DUAL LAYERS

CROSS-REFERENCE TO RELATED APPLICATION

The present application claims priority to and the benefit of Korean Patent Application No. 10-2023-0172413, filed on Dec. 1, 2023, in the Korean Intellectual Property Office, the disclosure of which is incorporated herein by reference.

BACKGROUND

1. Field

Aspects of embodiments of the present invention relate to a flow rate control apparatus and a flow rate control method for the same.

2. Description of the Related Art

A secondary battery is a battery that can be charged and discharged, unlike a primary battery that cannot be recharged. Low-capacity secondary batteries are used in small portable electronic devices such as smartphones, feature phones, notebook computers, digital cameras, and camcorders, and high-capacity secondary batteries are widely used as driving power sources and power storage batteries for motors in hybrid and electric vehicles. Such a secondary battery includes an electrode assembly provided with a positive electrode and a negative electrode, a case for accommodating the electrode assembly, electrode terminals connected to the electrode assembly, and the like.

Manufacturing such a secondary battery involves a process of coating a positive and negative electrode substrate with an active material slurry.

An electrode may be coated through a method of supplying slurry that is accommodated in a tank to a slot die using a pump, and coating the electrode with the slurry discharged through the slot die.

A drying process is performed on the coated electrode (e.g., electrode plate) while the coated electrode passes through a drying furnace, and coating quality of the electrode plate passed through the drying furnace is measured and managed in a width direction and a movement direction of the electrode using a loading level (hereinafter, L/L) per unit area measured by a densitometer.

However, in a system for coating an electrode, when a width of a slot die is increased to improve productivity, a large number of coating rows can be produced at the same time, but there is a problem of degrading the coating quality such as an increase in dispersion of the L/L per unit area in the width direction or the like.

In addition, in the system for coating an electrode, when a coating thickness is increased, there is a problem of degrading the quality of the electrode such as a decrease in bonding force between the electrode and a slurry after drying, a decrease in conductivity of ions due to binders concentrated in an upper portion, or the like.

Accordingly, a method of improving both the quality and productivity of an electrode is desired.

The above-described information described in the background technology of the present invention is only to facilitate understanding of the background of the present invention and can also have information not included in the conventional technology.

SUMMARY

Aspects of embodiments of the present invention relate to a flow rate control apparatus for coating multi-division dual layers, which controls a flow rate of the slurry for coating an electrode, and a flow rate control method for the same.

Aspects of some embodiments of the present invention are directed to providing a flow rate control apparatus and method for coating multi-division dual layers in which dual layers divided into a plurality of parts controls a flow rate of a slurry to adjust a coating amount of an electrode of a secondary battery and improve coating quality.

However, technical objectives to be solved by the present invention are not limited to the above-described objective, and other objectives which are not described above will be clearly understood by those skilled in the art through the following description.

According to some embodiments of the present invention, there is provided a flow rate control apparatus for coating multi-division dual layers, including: a plurality of slot dies organized into an upper layer and a lower layer, and configured to coat an electrode with a slurry; a pump configured to supply the slurry from a tank to each of the upper layer and the lower layer; a valve at the plurality of slot dies, and configured to divide the slurry supplied from the pump, and to supply the divided slurry to the plurality of slot dies; a flowmeter configured to measure a flow rate of the slurry supplied to the plurality of slot dies; and a processor configured to control the pump and the valve based on the flow rate of the slurry measured by the flowmeter to control a coating amount of the electrode.

In some embodiments, the valve is provided as a plurality of valves; the slurry to be supplied to the upper layer is supplied through the pump to the plurality of slot dies of the upper layer; and the slurry to be supplied to the lower layer is supplied through the pump to the plurality of slot dies of the lower layer.

In some embodiments, the pump includes: a first pump configured to supply the slurry accommodated in the tank to the upper layer; and a second pump configured to supply the slurry to the lower layer.

In some embodiments, the processor is configured to receive the flow rate for each of the plurality of slot dies using the flowmeter and to compare a sum of flow rates for the upper layer and a sum of flow rates for the lower layer; and in response to a ratio between sums of the flow rates for the layers not reaching a target value, the processor is configured to control revolutions per minute (RPM) of the pump to adjust a supply amount of the slurry being supplied to any one of the upper layer and the lower layer.

In some embodiments, the processor is configured to compare flow rates for the plurality of slot dies in the lower layer; and in response to there being a difference in flow rate for the plurality of slot dies between rows, the processor is configured to control the valve to reduce the difference in flow rate of the slurry for the plurality of slot dies.

In some embodiments, the flow rate control apparatus further includes a densitometer configured to measure a thickness of a coating amount of the electrode.

In some embodiments, in response to the coating amount of the electrode measured by the densitometer not satisfying a target coating amount, the processor is configured to control the pump to adjust a supply amount of the slurry.

In some embodiments, the processor is configured to calculate a difference in coating amount for the plurality of slot dies between rows measured using the densitometer; and in response to there being the difference in coating amount for the plurality of slot dies between the rows, the processor is configured to control the valve to adjust a flow rate of the slurry supplied to the plurality of slot dies.

In some embodiments, the processor is configured to calculate an average of flow rates for the plurality of slot dies of rows measured by the flowmeter, to calculate an amount of change by subtracting a target flow rate from an average value of the flow rates, and to set an amount of change in revolutions per minute (RPM) of the pump according to a range of the amount of change.

In some embodiments, the processor is configured to calculate a total average of flow rates measured by the flowmeter, to calculate a dispersion using values by subtracting flow rates of rows from the total average, and to adjust an opening degree of the valve according to a size of the dispersion.

According to some embodiments of the present invention, there is provided a flow rate control method for coating multi-division dual layers, including: supplying, by a pump, a slurry for coating an electrode to an upper layer and a lower layer of a slot die from a tank; dividing, by a valve, the slurry supplied from the pump and supplying the divided slurry to a plurality of slot dies of the upper layer and the lower layer; measuring, by a flowmeter, flow rates of the slurry supplied to the plurality of slot dies; and changing, by a processor, a flow rate of the slurry supplied to any one of the plurality of slot dies by controlling at least any one of the pump and the valve based on the flow rates of the slurry measured by the flowmeter.

In some embodiments, the supplying of the slurry includes: supplying, by a first pump, the slurry accommodated in the tank to the upper layer; and supplying, by a second pump, the slurry to the lower layer.

In some embodiments, the dividing of the slurry and supplying of the divided slurry includes: dividing, by a valve installed at the upper layer, the slurry to be supplied to the upper layer and supplying the divided slurry to the plurality of slot dies provided in the upper layer; and dividing, by a valve installed at the lower layer, the slurry to be supplied to the lower layer and supplying the divided slurry to the plurality of slot dies provided in the lower layer.

In some embodiments, the changing of the flow rate of the slurry includes: receiving each of the flow rates for the plurality of slot dies through the flowmeter and comparing a sum of the flow rates for the upper layer and a sum of the flow rates for the lower layer; determining whether a ratio between the sums of the flow rates for the layers reaches a target value according to a comparison result; and controlling revolutions per minute (RPM) of the pump to adjust a supply amount of the slurry supplied to any one of the upper layer and the lower layer in response to the ratio between layers to the sum of the flow rates not reaching the target value.

In some embodiments, the changing of the flow rate of the slurry includes: comparing the flow rates for the plurality of slot dies at the lower layer; and controlling the valve to reduce a difference in flow rate of the slurry for the plurality of slot dies in response to there being the difference in flow rate between rows of the plurality of slot dies as a result.

In some embodiments, the changing of the flow rate of the slurry includes: calculating averages of the flow rates for the plurality of slot dies for rows measured by the flowmeter; calculating an amount of change by subtracting a target flow rate from average values of the flow rates; and setting an amount of change of revolutions per minute (RPM) of the pump according to a range of the amount of change.

In some embodiments, the changing of the flow rate of the slurry includes: calculating a total average of the flow rates measured by the flowmeter; calculating a dispersion using values calculated by subtracting flow rates for rows from the total average; and adjusting an opening degree of the valve according to a size of the dispersion.

In some embodiments, the flow rate control method further includes measuring, by a densitometer, a thickness of a coating amount for the electrode.

In some embodiments, the flow rate control method further includes comparing, by the processor, the coating amount for the electrode measured by the densitometer and a target coating amount; and controlling, by the processor, the pump to adjust a supply amount of the slurry in response to the coating amount of the electrode not satisfying the target coating amount.

In some embodiments, the flow rate control method further includes calculating, by the processor, a difference in coating amount between rows for the plurality of slot dies measured by the densitometer; and controlling, by the processor, the valve to adjust flow rates of the slurry supplied to the plurality of slot dies in response to there being a difference in coating amount between rows for the plurality of slot dies.

BRIEF DESCRIPTION OF DRAWINGS

The following drawings attached to this specification illustrate embodiments of the present invention, and further describe aspects and features of the present invention together with the detailed description of the present invention. Thus, the present invention should not be construed as being limited to the drawings:

FIG. 7 is a table showing pump control standard values of the flow rate control apparatus for coating multi-division dual layers according to some embodiments of the present invention;

FIG. 8 is a table showing standard values for opening degrees of valves of the flow rate control apparatus for coating multi-division dual layers according to some embodiments of the present invention;

FIGS. 9A-9B show graphs of dispersions of flow rates and thicknesses according to the operation of a pump of the flow rate control apparatus for coating multi-division dual layers according to some embodiments of the present invention; and FIGS. 10A-10B show graphs of flow rate control results of the flow rate control apparatus for coating multi-division dual layers according to some embodiments of the present invention.

DETAILED DESCRIPTION

Figure 1:
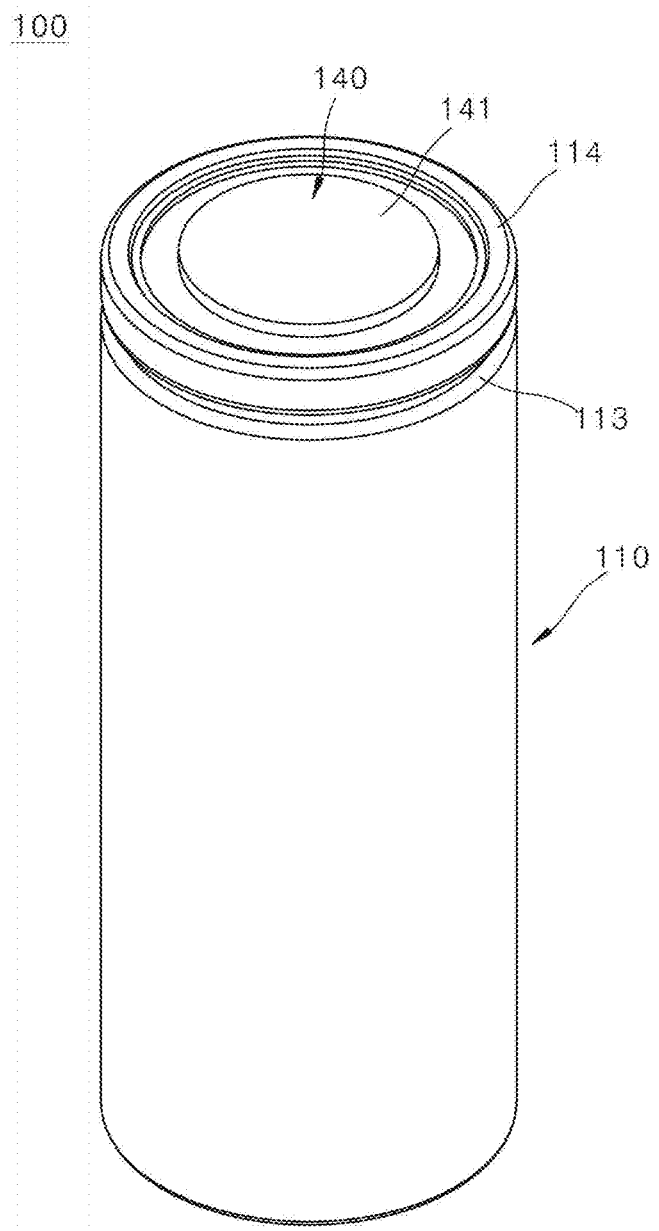
FIGS. 1 and 2 are, respectively, a schematic and a block diagram illustrating a cylindrical battery, according to some embodiments of the present invention.

Hereinafter, exemplary embodiments of the present invention will be described in detail with reference to the accompanying drawings. First, terms and words used in the present specification and claims should not be interpreted as being limited to commonly used meanings or meanings in dictionaries and should be interpreted as having meanings and concepts which are consistent with the technological scope of the present invention based on the principle that the inventors have appropriately defined concepts of the terms in order to describe the present invention in the best way. Therefore, because the embodiments described in this specification and components illustrated in the drawings are only some exemplary embodiments and do not represent the overall technological scope of the present invention, it should be understood that there may be various equivalents or modifications substituting the exemplary embodiments at the time of filing of this application. In addition, the terms "comprise," "include," "comprising," and/or "including" used herein specify some stated shapes, numbers, steps, operations, members, elements, and/or presence of groups thereof but do not preclude one or more other shapes, numbers, operations, members, elements, and/or presence or addition of groups thereof. In addition, when the embodiments of the present invention are described, the terms "may" or "may be" may include "one or more embodiments of the present invention."

In addition, in order to facilitate understanding of the present invention, the accompanying drawings are not drawn to scale, and dimensions of some components may be exaggerated. In addition, like reference numerals may be assigned to like elements in different embodiments.

The expression "two comparative objects are the same" means "the two comparative objects are actually the same." Therefore, the term "actually the same" includes a case in which there is a deviation considered as a low level in the art, for example, a deviation of 5% or less. In addition, the description "some parameters are uniform within a certain region" may mean that "some parameters are uniform in an average viewpoint."

Although terms such as first, second, or the like may be used for describing various elements, the elements are not limited by the terms. These terms are only used to distinguish one element from another element, and unless otherwise specifically described, a first element may also be a second element.

Throughout the specification, unless specifically described otherwise, each element may be singular or a plurality.

A case in which a first element is disposed "above (or under)" or "on (or below)" a second element may include a case in which the first element is disposed to be in contact with an upper (or lower) surface of the second element or a case in which a third element may be interposed between the first element and the second element disposed above (or under) the first element.

It should be understood that, when a first element is referred to as being "connected," "coupled," or "bonded" to a second element, although the first element may be directly connected or bonded to the second element, it should be understood that a third element may be interposed therebetween, or the elements may be connected, coupled, or bonded through other elements. In addition, when a first part is referred to as being "electrically connected" to a second part, it includes not only a case in which the first part is "directly connected" to the second part but also a case in which the first part is "connected" to the second part with a third element interposed therebetween.

As used herein, the term "and/or" includes any and all combinations of one or more of the associated listed items. For example, the expression "A and/or B" denotes A, B, or A and B. Expressions such as "one or more of" and "at least one of," when preceding a list of elements, modify the entire list of elements and do not modify the individual elements of the list. For example, the expression "one or more of A, B, and C," "at least one of A, B, or C," "at least one of A, B, and C," and "at least one selected from the group consisting of A, B, and C" indicates only A, only B, only C, both A and B, both A and C, both B and C, or all of A, B, and C.

Further, the use of "may" when describing embodiments of the inventive concept refers to "one or more embodiments of the inventive concept." Also, the term "exemplary" is intended to refer to an example or illustration.

Figure 2:
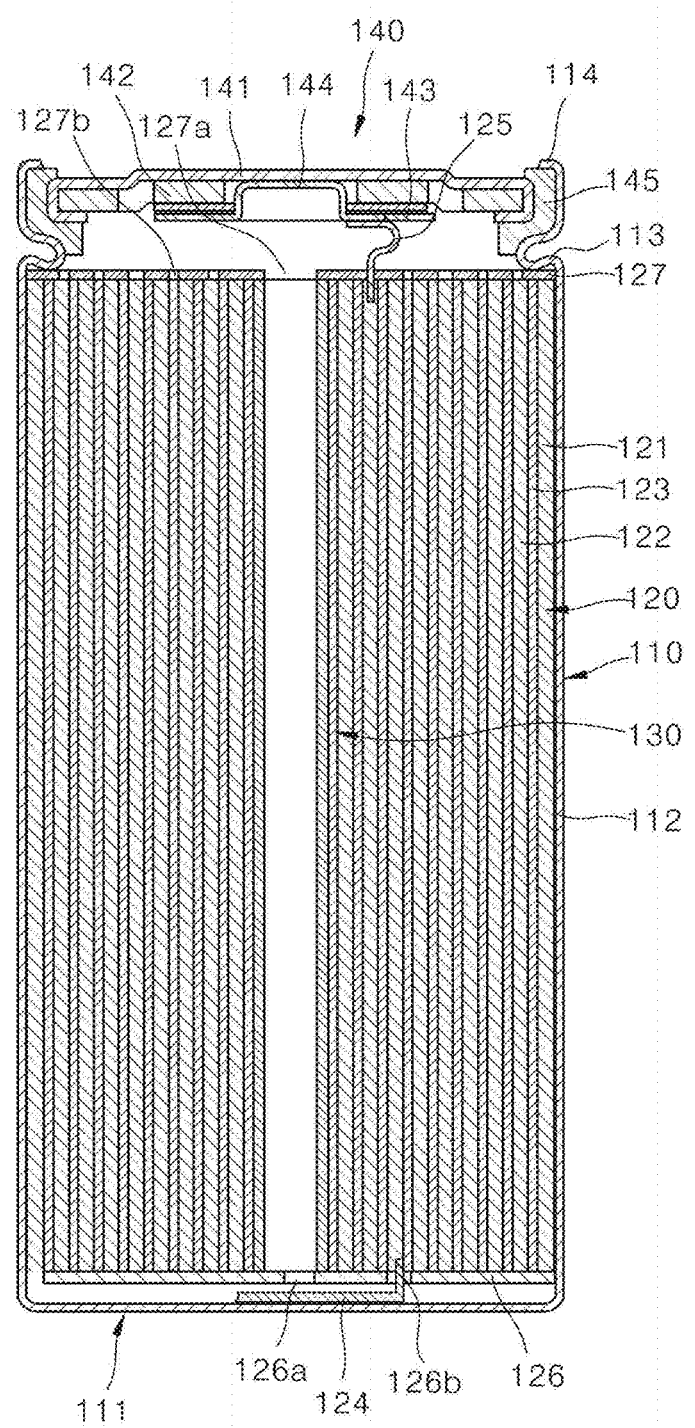

FIGS. 1 and 2 are, respectively, a schematic and a block diagram illustrating a cylindrical battery, according to some embodiments of the present invention.

Referring to FIGS. 1 and 2, a cylindrical lithium-ion secondary battery 100 according to various embodiments of the present invention may include a cylindrical can 110, an electrode assembly 120, and a cap assembly 140. In addition, the cylindrical lithium-ion secondary battery 100 may further include a center pin 130 in some cases. In addition, in the secondary battery 100 according to the embodiment of the present invention, because the cap assembly 140 serves to interrupt a current, the cap assembly 140 may be referred to as a current interrupt device in some cases.

The cylindrical can 110 may include a bottom portion 111 having a substantially circular shape and a cylindrical sidewall 112 extending upward from a circumferential portion of the bottom portion 111 to a set or predetermined length. During a manufacturing process of the secondary battery, an upper portion of the cylindrical can 110 is open. Accordingly, during an assembly process of the secondary battery, the electrode assembly 120 and the center pin 130 along with an electrolyte may be inserted into the cylindrical can 110. For example, the cylindrical can 110 may be formed of steel, stainless steel, aluminum, aluminum alloy, and/or an equivalent material thereof, but is not limited thereto.

In addition, the cylindrical can 110 may include a beading part 113 disposed below the cap assembly 140 to be recessed inward and a crimping part 114 disposed above the cap assembly 140 to be bent inward such that the cap assembly 140 does not escape to the outside. Here, the beading part 113 and the crimping part 114 are disposed around the cap assembly 140.

The electrode assembly 120 may be accommodated in the cylindrical can 110. The electrode assembly 120 may include a negative electrode plate 121 in which a negative current collector plate is coated with a negative active material (e.g., graphite, carbon, or the like), a positive electrode plate 122 in which a positive current collector plate is coated with a positive active material (e.g., a transition metal oxide, such as $LiCoO_2$, $LiNiO_2$, $LiMn_2O_4$, or the like), and a separator 123 positioned between the negative electrode plate 121 and the positive electrode plate 122 to prevent or substantially reduce the likelihood of a short circuit and allow only lithium-ions to move. In addition, the negative electrode plate 121, the positive electrode plate 122, and the separator 123 may be wound in a substantially cylindrical shape. Here, for example, the negative current collector plate may be manufactured of a copper (Cu) foil and/or the like, and the positive electrode current collector plate may be formed of an aluminum (Al) foil and/or the like, and the separator may be formed of polyethylene (PE), polypropylene (PP), and/or the like, but the present invention is not limited thereto.

In addition, a negative tab 124 protruding downward to extend to a set or predetermined length may be welded to the negative electrode plate 121, and the positive tab 125 protruding upward to extend to a set or predetermined length may be welded to the positive electrode plate 122, but the opposite is possible. In addition, for example, the negative tab 124 may be formed of copper (Cu), nickel (Ni), and/or the like, and the positive tab 125 may be formed of aluminum (Al), and/or the like, but the present invention is not limited thereto.

In addition, the negative tab 124 of the electrode assembly 120 may be welded to the bottom portion 111 of the cylindrical can 110. Accordingly, the cylindrical can 110 may operate as a negative electrode. However, conversely, the positive tab 125 may be welded to the bottom portion 111 of the cylindrical can 110, and in this example, the cylindrical can 110 may operate as a positive electrode.

In addition, a first insulating plate 126, which is coupled to the cylindrical can 110 and in which a first hole 126a is formed at a center thereof and a second hole 126b is formed at an outer side thereof, may be interposed between the electrode assembly 120 and the bottom portion 111. The first insulating plate 126 serves to prevent the electrode assembly 120 from coming into electrical contact with the bottom portion 111 in the cylindrical can 110, or substantially reduce the likelihood of such electrical contact. In some examples, the first insulating plate 126 serves to prevent the positive electrode plate 122 in the electrode assembly 120 from coming into electrical contact with the bottom portion 111, or substantially reduce the likelihood of such electrical contact. Here, the first hole 126a serves to allow the gas to quickly move upward through the center pin 130 when a large amount of gas is generated due to abnormality of the secondary battery, and the second hole 126b serves to allow the negative tab 124 to pass therethrough and be welded to the bottom portion 111.

In addition, a second insulating plate 127, which is coupled to the cylindrical can 110 and in which a first hole 127a is formed at a center thereof and a plurality of second holes 127b are formed at an outer side thereof, may be interposed between the electrode assembly 120 and the cap assembly 140. The second insulating plate 127 serves to prevent the electrode assembly 120 from coming into electrical contact with the cap assembly 140, or substantially reduce the likelihood of such electrical contact. In some examples, the second insulating plate 127 serves to prevent the negative electrode plate 121 in the electrode assembly 120 from coming into electrical contact with the cap assembly 140, or substantially reduce the likelihood of such electrical contact. Here, the first hole 127a serves to allow the gas to quickly move to the cap assembly 140 when a large amount of gas is generated due to abnormality of the secondary battery, and the second holes 127b serve to allow the positive tab 125 to pass therethrough and be welded to the cap assembly 140. In addition, the remaining second holes 127b serve to allow the electrolyte to quickly flow into the electrode assembly 120 in an electrolyte injection process.

In addition, diameters of first holes 126a and 127a of the first and second insulating plates 126 and 127 should be formed to be smaller than a diameter of the center pin 130 so that the center pin 130 does not come into electrical contact with the bottom portion 111 of the cylindrical can 110 or the cap assembly 140 when an external impact is applied thereto.

The center pin 130 may have a hollow circular pipe shape and may be coupled to substantially a center of the electrode assembly 120. For example, the center pin 130 may be formed of steel, stainless steel, aluminum, aluminum alloy, polybutylene terephthalate, and/or the like, but is not limited thereto. The center pin 130 serves to suppress deformation of the electrode assembly 120 during charging or discharging of the battery and serves as a moving passage of gas generated in the secondary battery. However, the center pin 130 may be omitted in some cases.

The cap assembly 140 may include a top plate 141, a middle plate 142, an insulating plate 143, and a bottom plate 144.

The middle plate 142 may be positioned under the top plate 141 and may have a substantially flat shape.

When viewed from below, the insulating plate 143 may be formed in a circular ring shape having a set or predetermined width. In addition, the insulating plate 143 serves to insulate the middle plate 142 and the bottom plate 144 from each other. For example, the insulating plate 143 may be interposed between and ultrasonically welded to the middle plate 142 and the bottom plate 144 but is not limited thereto.

Although the present invention has been described with the example of the cylindrical secondary batter, the present invention may be applied to any secondary battery including an electrode.

Figure 3:
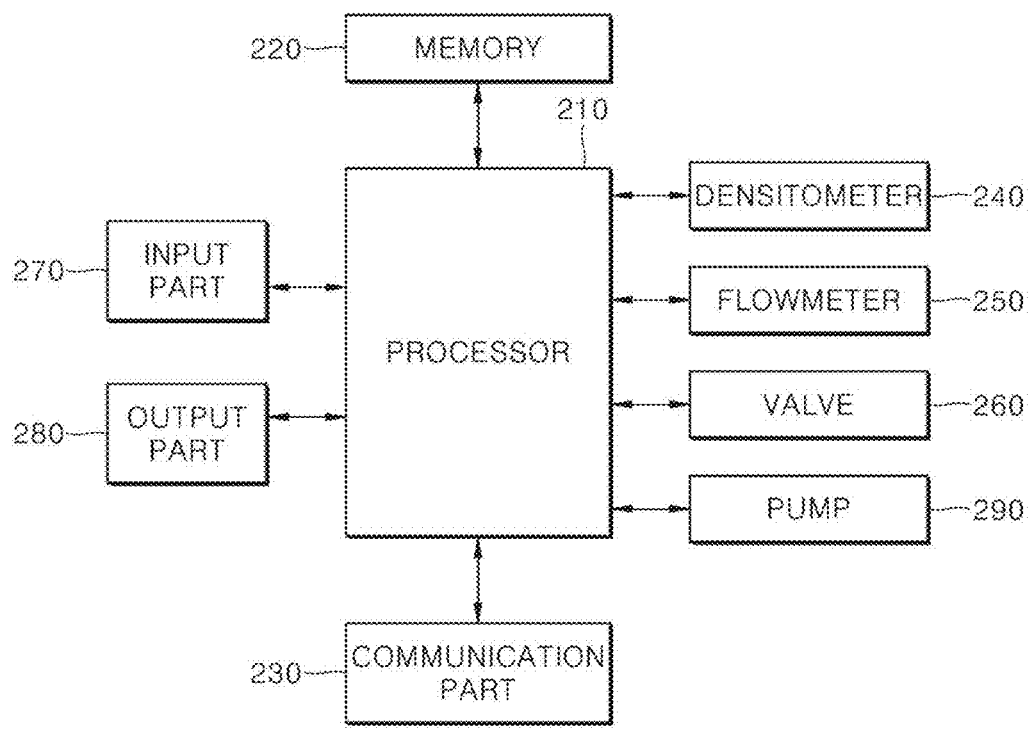
FIG. 3 is a schematic block diagram illustrating a flow rate control apparatus for coating multi-division dual layers according to some embodiments of the present invention.

FIG. 3 is a schematic block diagram illustrating a flow rate control apparatus for coating multi-division dual layers according to some embodiments of the present invention.

A flow rate control apparatus 200 for coating multi-division dual layers (hereinafter, flow rate control apparatus) may adjust an amount of the slurry for coating electrode in a system for coating the electrode of the secondary battery.

Referring to FIG. 3, the flow rate control apparatus 200 according to some embodiments of the present invention may include a memory 220, a communication part 230, an input part 170, an output part 180, a densitometer 240, a flowmeter 250, a valve 260, a pump 290, and a processor 210.

The densitometer 240 may measure a coating amount (thickness) on the basis of a density of coated slurry. A separate thickness measurement device may be used as the densitometer 240.

The densitometer 240 may be installed at (e.g., installed on) each of a front end and a rear end of a drying furnace and may measure the coating amount (e.g., its thickness).

The densitometer 240 may obtain density data or thickness data for a width direction and a moving direction. The densitometer 240 inputs the obtained data to the processor 210.

The flowmeter 250 measures a flow rate of the slurry moved by the pump 290. The flowmeter 250 measures an amount of the slurry with which the electrode is coated and inputs the measured amount to the processor 210.

The flowmeter 250 may be installed at (e.g., installed on) each of a plurality of rows corresponding to a plurality of slot dies. The flowmeter 250 may be installed at (e.g., installed on) each of an upper layer and a lower layer of the plurality of rows.

The valve 260 divides the slurry supplied through the pump 290 and supplies the divided slurry to the slot dies of the plurality of rows.

The valve 260 may adjust an amount of the slurry to be supplied. An automatic valve may be used as the valve 26. The valve 260 adjusts an amount of the slurry by adjusting an opening degree thereof according to a control command of the processor 210.

The pump 290 supplies the slurry from a tank in which the slurry is accommodated to a system for coating electrode. One pump 290 may be installed on one tank.

The memory 220 may store density data or thickness data input from the densitometer 240 and flow rate data of the slurry input from the flowmeter 250. The memory 220 may store data of an opening degree of the valve 260 and revolutions per minute (RPM) of the pump 290. In addition, the memory 220 may store feedback data of the densitometer 240 and store set data for controlling the pump 290 and the valve 260 on the basis of the feedback data.

The memory 220 may store data about a flow rate control algorithm, a coating amount control algorithm, a thickness measurement algorithm, a pump control algorithm, a linked control algorithm, a valve control algorithm, and the like.

The memory 220 may include a storage medium such as a random-access memory (RAM), a non-volatile memory such as read-only memory (ROM) and an electrically erasable programmable ROM (EEPROM), a flash memory, a hard disc drive (HDD), a solid-state drive (SSD), a solid disc drive (SDD), and/or the like.

The communication part 230 transmits and receives data to and from the processor 210, the memory 220, the densitometer 240, the flowmeter 250, the valve 260, the pump 290, the input part 270, and the output part 280. In addition, the communication part 230 may transmit and receive data to and from an external terminal or server.

The communication part 230 supports at least one among near field communication such as Ethernet, WiFi, and Bluetooth, mobile communication, and serial communication.

The input part 270 may receive data for flow rate control. In addition, the input part 270 may receive a user command according to flow rate control. The input part 270 may include at least one among at least one button, a switch, and a touchpad.

The processor 210 may include at least one microprocessor and operate on the basis of the algorithms and data stored in the memory 22.

The processor 210 controls the pump 290 to supply the slurry for coating electrode from the tank and to adjust a supply amount of the slurry and controls the valve 260 to adjust an amount of the slurry supplied to each of the slot dies of the plurality of rows.

The processor 210 supplies the slurry from one tank through one pump 290, and the slurry to be supplied is divided and supplied to the slot dies of the plurality of rows.

The processor 210 may monitor an amount of the slurry for each of the plurality of rows on the basis of data measured by the flowmeter 250 and control the valve 260 in respond to the monitored amount.

The processor 210 may control the valve 260 installed at (e.g., installed on) each of the plurality of rows.

In addition, the processor 210 may measure a flow rate of the slurry controlled by the valve 260 through the flowmeter 250. The processor 210 may measure flow rates of the slurry for the upper layer and the lower layer of the plurality of rows through a plurality of flowmeters 250 installed on the slot dies of the plurality of rows.

The processor 210 may receive the flow rates of the slurry for the slot dies of the plurality of rows measured by the flowmeters 250 and data of densitometers 240 connected to an upper end and a lower end of the drying furnace to feedback-control the pump 290 (e.g., control the pump 290 using feedback). In addition, the processor 210 may feedback-control the valve 260 (e.g., control the valve 260 using feedback).

The processor 210 may adjust a coating amount of the electrode by continuously feedback-controlling the pump 290 and the valve 260.

Figure 4:
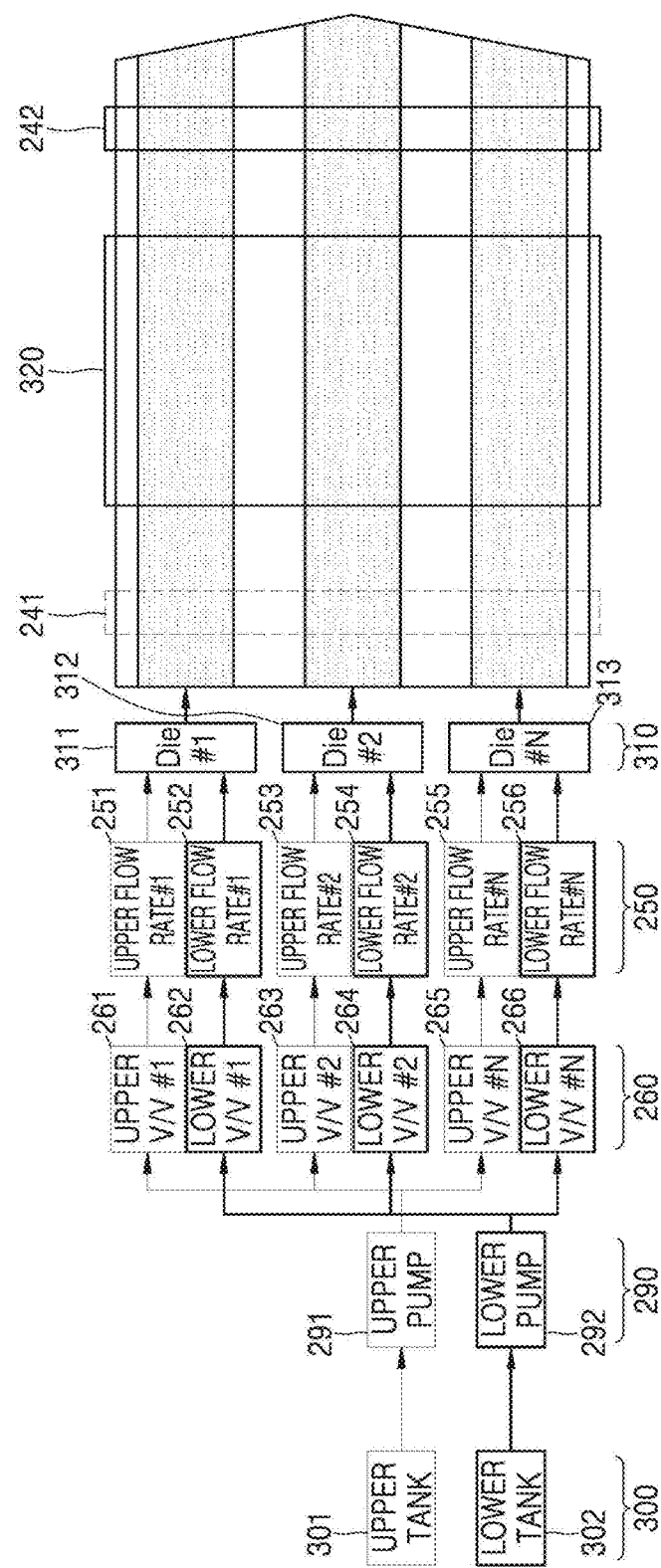
FIG. 4 is a view illustrating a configuration of a system for coating multi-division dual layers according to some embodiments of the present invention.

FIG. 4 is a view illustrating a configuration of a system for coating multi-division dual layers according to some embodiments of the present invention.

Referring to FIG. 4, a system including a flow rate control apparatus 200 may include tanks 300, pumps 290, valves 260, flowmeters 250, a plurality of slot dies 310, densitometers 240, and a drying furnace 320.

The system supplies slurry accommodated in the tanks 300 according to driving of the pumps 290 to coat an electrode of a secondary battery with the slurry.

In such examples, a dual layer method in which an upper layer and a lower layer are divided and individually operated may be used in the system. In addition, the system in which a plurality of rows are formed in an upper portion and a plurality of rows are formed in a lower portion in the same or substantially the same manner may perform coating on the electrode through a multi-division method.

The flow rate control apparatus 200 may control the pumps 290 to supply the slurry from the tanks 300

In such examples, a first pump 291 is included in the upper layer to supply the slurry to the upper layer from a first tank 301 of the upper layer. In addition, a second pump 292 of the lower layer supplies the slurry of a second tank 302 of the lower layer to the lower layer.

The processor 210 may control valves 261, 263, and 265 of the upper layer to supply the same amounts of the slurry to the rows on the upper layer including the slot dies 310 of the plurality of rows. In addition, the processor 210 may control valves 262, 264, and 266 of the lower layer to supply the same or substantially the same amounts of the slurry to the rows on the lower layer including the slot dies 310 of the plurality of rows.

The processor 210 controls a plurality of valves 260 to control an amount of the slurry and measures flow rates of the slurry for the plurality of rows of the upper layer using a plurality of flowmeters 251, 253, and 355. The processor 210 may measure flow rates of the slurry for the rows of the lower layer using a plurality of flowmeters 252, 254, and 256.

The processor 210 may feedback-control the valves 260 on the basis of the measured flow rates for the plurality of rows. In addition, the processor 210 may calculate an amount of the slurry supplied through the pumps 290 on the basis of the sum of the flow rates for the plurality of rows to control RPM of the pumps 290.

The processor 210 may control the pump 290 to reduce the amount of the slurry when a total amount of the slurry for each layer is so large, and control the pump 290 of the corresponding layer to increase the amount of the slurry when the amount of the slurry is insufficient.

When there are differences between flow rates of the slurry for the rows, the processor 210 may control the valves 260 to reduce the differences between the flow rates of the slurry in the rows on the basis of flow rate values for the plurality of rows. For example, the processor 210 may increase an opening degree of a valve for a row of which a flow rate is insufficient and decrease an opening degree of a valve for a row of which a flow rate is so high.

In addition, when the electrode is coated with the slurry supplied to a plurality of slot dies 311 to 313, the processor 210 may measure coating thicknesses using the densitometers 240 and obtain data for a width direction and a moving direction of the electrode.

The processor 210 calculates an amount of the slurry for each layer, measures an amount of the slurry for each row of the layers in real time, and controls the pumps 290 and the valves 260 to uniformly distribute amounts of the slurry to the plurality of rows.

The processor 210 may measure data on a flow rate of the slurry actually flowing through each of the rows for each row or layer using the flowmeters 250 installed at the plurality of rows.

The processor 210 may input a control command to any one layer to adjust balance of the flow rate of the slurry between the upper layer and the lower layer.

The processor 210 may obtain electrode coating amounts and dispersions for each of the rows on the basis of data of the flowmeters 250 and data of the densitometers 240, and thus may measure a total loading level (hereinafter, L/L) per unit area or a thickness to obtain data on the width direction and the moving direction.

Figure 5:
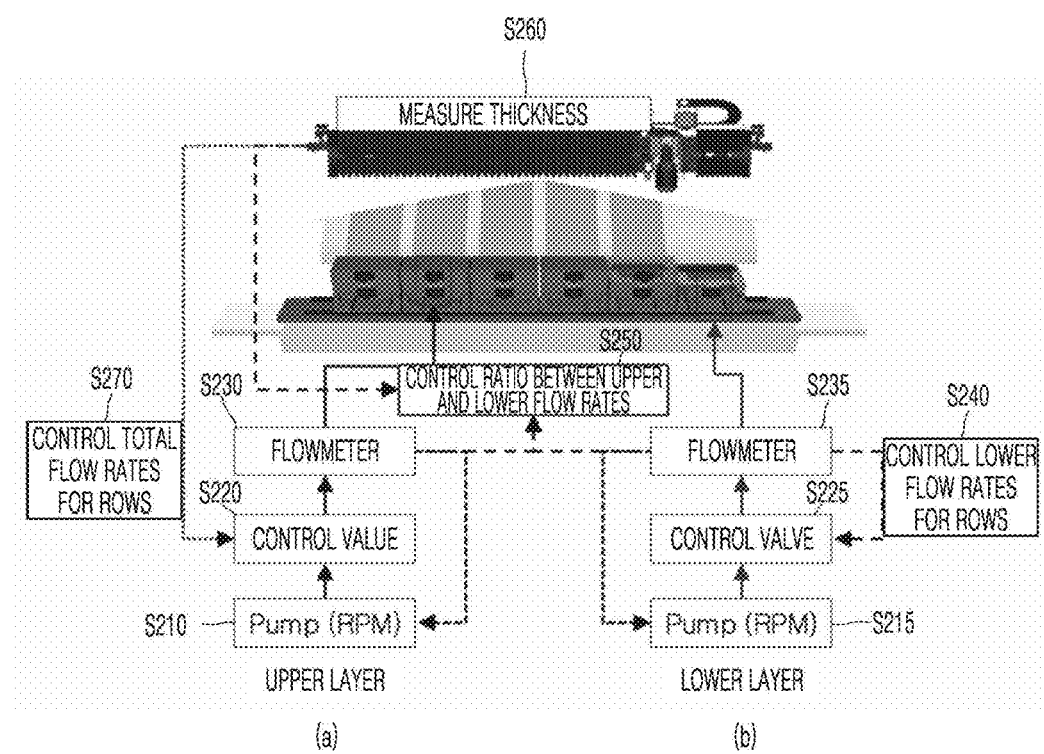
FIG. 5 is a view illustrating an operation flow of the flow rate control apparatus for coating multi-division dual layers according to some embodiments of the present invention.

FIG. 5 is a view illustrating an operation flow of the flow rate control apparatus for coating multi-division dual layers according to some embodiments of the present invention.

According to FIG. 5, the processor 210 may use the pumps 290 and the valves 260 to control flow rates for the plurality of rows formed on an upper layer (a) and a lower layer B. Accordingly, the processor 210 automatically controls flow rates of the slurry so that the electrode is coated with a set or predetermined thickness. The processor 210 drives the pumps 290 for the upper layer (a) and the lower layer B. The processor 210 may drive the first pump 291 of the upper layer (a) (S210) and the second pump 292 of the lower layer (b) (S215).

The processor 210 may control the plurality of valves 261, 263, and 265 of the upper layer (a) A (S220) and control the plurality of valves 262, 264, and 266 of the lower layer (b) (S225) so that the slurry is distributed and supplied to the plurality of rows.

The processor 210 calculates flow rates for the plurality of rows of the upper layer (a) and the lower layer (b) on the basis of flow rate data measured by the plurality of flowmeters 250.

The processor 210 measures flow rates for the plurality of rows of the upper layer (a) using the plurality of flowmeters 251, 253, and 255 (S230). In addition, the processor 210 may measure flow rates for the rows of the lower layer using the plurality of flowmeters 252, 254, and 256 (S235).

The processor 210 may control flow rates for the rows by controlling the valves 260 on the basis of the flow rates measured by the flowmeters 250 (S240). The processor 210 may control the valves according to the flow rates for the upper layer (a) and the lower layer (b) to reduce a difference in flow rate between the rows.

The processor 210 may compare an average value of all flow rates for coating in each row and a target flow rate value on the basis of the flow rates of the slurry to control the pumps 290 according to a difference therebetween.

In addition, the processor 210 may calculate a total amount of the slurry for the upper layer (a) and the lower layer (b) on the basis of data measured by the plurality of flowmeters 250 and control the pumps 290 on the basis of the calculated sum to control amounts of the slurry supplied from the tanks 300. The processor 210 may adjust the RPM of the pumps 290 to adjust a total amount of the slurry supplied to the upper layer (a) and the lower layer B.

The processor 210 may compare a flow rate of the upper layer (a) and a flow rate of the lower layer (b) to control a ratio thereof (S250).

The processor 210 may compare the flow rate of the upper layer (a) and the flow rate of the lower layer (b) to control the pumps 290 on the basis of a result thereof.

In addition, the processor 210 may calculate a dispersion of coating amounts for each row using the flowmeters 250 and feedback-control the valves 260.

The processor 210 may determine opening degrees of the valves 260 installed in the rows on the basis of the calculated dispersion to automatically adjust flow rates of the slurry (S260).

The processor 210 compares an L/L per unit area and a total thickness, which are measured by the densitometers 240 or thickness measurement devices, and the sum of the flow rates of the upper layer (a) and the lower layer (b) to compensate for different values.

The processor 210 may input a control command for total flow rates for the rows to the valves of the upper layer and the valves of the lower layer to control the total flow rates for the rows.

The processor 210 may compensate for a difference in the flow rates of the layers to eliminate an error according to a measurement method.

Figure 6:
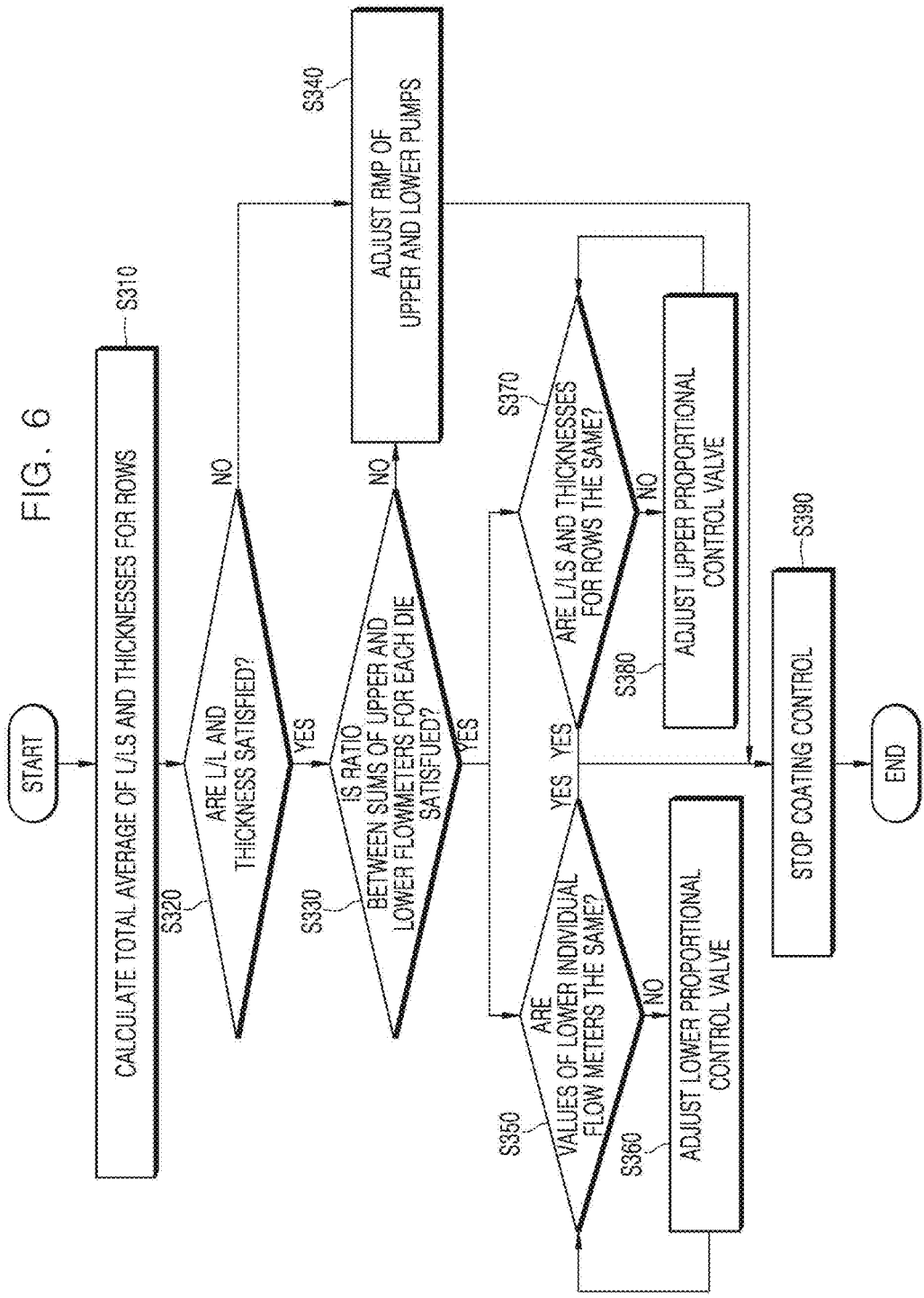
FIG. 6 is a flow diagram illustrating a flow rate control method for coating multi-division dual layers according to some embodiments of the present invention.

FIG. 6 is a view illustrating a flow rate control method for coating multi-division dual layers according to some embodiments of the present invention.

Referring to FIG. 6, the processor 210 may measure L/Ls per unit area or coating thicknesses using the densitometers 240.

The processor 210 may calculate a total average L/L and a total average thickness for the plurality of rows.

The processor 210 may calculate averages for three rows of the upper layer (a) and for three rows of the lower layer B.

The processor 210 determines whether the L/L and the thickness satisfy target values (S320).

When the L/L and the thickness do not reach a target coating amount, the processor 210 may determine that an amount of the slurry for coating is insufficient and control the RPM of at least one of the pumps 291 and 292 of the upper layer (a) and the lower layer (b) (S340).

Further, when the L/L and the thickness satisfy the target coating amount, the processor 210 compares the sum of measured values of the flowmeters of the upper layer (a) and the sum of measured values of the flowmeters of the lower layer (b) for each slot die to determine whether a ratio thereof satisfies a set value (S330).

When a ratio between sums of flow rates for each layer does not satisfy a set value, the processor 210 may control the RPM of at least one of the pumps 291 and 292 of the upper layer (a) and the lower layer (b) (S340).

Accordingly, the processor 210 may control a flow rate and the pumps 290 in conjunction with each other.

When the ratio between the sums of the flow rates for each layer satisfies the set value, the processor 210 determines whether values of the flowmeters of each row of the lower layer are the same (S350).

When the measured values of the flowmeter 250 of each row are not the same, the processor 210 proportionally controls the plurality of valves 260 for the lower layer (S360).

Further, the processor 210 may determine whether L/Ls and thicknesses for each row are the same (S370). When the L/Ls and the thicknesses for each row are the same, the processor 210 may proportionally control the valves 260 of the upper layer (a) (S380).

The processor 210 may repeatedly perform the proportional control on the valves 260 until a condition is satisfied.

Accordingly, the processor 210 may control a flow rate and the valves 260 in conjunction with each other.

The processor 210 may stop a coating control in a case in which measured values of the flowmeter 250 of each row are the same or substantially the same or a case in which the L/Ls and the thicknesses for each row are the same or substantially the same.

FIG. 7 is a table showing pump control standard values of the flow rate control apparatus for coating multi-division dual layers according to some embodiments of the present invention.

According to FIG. 7, the processor 210 may control the flowmeters 250 and the pumps 290 in conjunction with each other.

The processor 210 may measure amounts of the slurry supplied to the slot dies 310 using the flowmeters 250 and control the pumps 290 according to measured flow rate values on the basis of the linked control algorithm.

The slurry supplied to the slot dies 310 passes through the flowmeters 250, moves in the moving direction, and coats the electrode.

Accordingly, the processor 210 may calculate coating amounts on the basis of the flow rates measured by the flowmeters 250. Accordingly, the processor 210 may analyze the amounts of the slurry supplied to the slot dies 310, the flow rates measured by the flowmeters 250, and the coating amounts measured by the densitometers 240 in conjunction with each other.

The processor 210 may calculate an average flow rate value of the flow rates for each row. When the average flow rate value is smaller than a target flow rate value, the processor 210 may control the pump 290 to increase a supply amount of the slurry, and when the average flow rate value is greater than the target flow rate value, the processor 210 may control the pump 290 to reduce the supply amount of the slurry.

In addition, the processor 210 may calculate an average of coating amounts (e.g., coating thicknesses) for each row and calculate a flow rate value to reach a target coating amount to control the pump 290.

Accordingly, as illustrated in FIG. 7, the processor 210 may repeatedly perform an experiment to standardize the RPM of the pump 290.

The processor 210 may set the RPM of the pump 290 with reference to FIG. 7 and repeatedly perform a process of changing the RPM of the pump 290 according to the flow rate value and the thickness to obtain the target flow rate value.

The processor 210 may store a setting of the pump 290 for satisfying the target flow rate value in the memory 220.

Accordingly, the processor 210 may obtain data for an amount of a change in the RPM of the pump on the basis of an amount of a change calculated by subtracting a target flow rate from a flow rate average in the moving direction.

The processor 210 may classify amounts of a change into a plurality of levels (which may be changed as desired) to set an amount of change in the RPM of the corresponding pump. In such examples, because a difference in amount of change in the RPM may vary according to properties of the slurry used as a coating agent, an optimal corresponding value for each type of slurry may be found through an experiment.

FIG. 8 is a table showing standard values for opening degrees of valves of the flow rate control apparatus for coating multi-division dual layers according to some embodiments of the present invention.

According to FIG. 8, the processor 210 may control the valves 260 in conjunction with measured values of the flowmeters 250.

The processor 210 may group one slot die 310, one flowmeter 250, and one valve 260 and calculate a dispersion of coating amounts for each slot die.

The processor 210 may control opening degrees of the valves on the basis of the calculated dispersions according to a range of the dispersions as in FIG. 8.

In such examples, the controlling of the opening degree of the valve 260 may change a flow rate of the slurry for the slot die 310, and a coating amount of the electrode may be changed according to a change in flow rate of the slurry.

The processor 210 may repeatedly adjust the opening degree of the valve according to the dispersion to calculate an opening degree of the valve satisfying a target coating amount. In such examples, an optimum value for each type of slurry may be found because there may be changes in valve adjustment and coating amount according to the type of slurry.

FIGS. 9A-9B show graphs of dispersions of flow rates and thicknesses according to the operation of a pump of the flow rate control apparatus for coating multi-division dual layers according to some embodiments of the present invention.

As in FIG. 9A, the processor 210 may calculate dispersions of coating amounts according to the RPM of the pumps 290 and flow rates measured by the flowmeters 250 and analyze a correlation between the RPM of the pumps 290 and the flow rates. The relationship between the RPM of the pumps 290 and the flow rates may have a linear characteristic (e.g., the flow rates may be linearly proportional to the RPM of the pumps 290).

When the RPM of the pump 290 increases, a flow rate increases in response thereto, and a dispersion for the RPM of each pump 290 can be calculated.

In addition, as in FIG. 9B, a measurement deviation for flow rates changed according to the RPM of the pump 290 may be checked. The deviation is a difference between a maximum value and a minimum value when measured a number of times (e.g., three times).

In such examples, the processor 210 may control a flow rate in an actual use range D1, which is an example in which a lowest deviation is calculated, and the RPM of the pump 290 is 180 and 210.

Because a reproducibility and a dispersion is about ±1%, the processor 210 may control flow rates for the plurality of slot dies 310 of the upper layer (a) and the lower layer B.

FIGS. 10A-10B show graphs of flow rate control results of the flow rate control apparatus for coating multi-division dual layers according to some embodiments of the present invention.

As in FIGS. 10A and 10B, the processor 210 supplies the slurry to the upper layer (a) and the lower layer B, distributes the slurry to the plurality of rows, and measures flow rates of the slurry using the flowmeters 250.

The processor 210 may calculate a dispersion of the flow rates in the lower layers B.

The processor 210 may calculate a dispersion in the rows of the upper layer (a) and the lower layer B.

The processor 210 may verify a flow rate control within a flow rate dispersion of ±0.2% in the lower layer (b) and a flow rate dispersion of ±0.5% in the upper layer (a) and the lower layer B.

The processor 210 may control the pumps 290 and the valves 260 according to flow rates to reduce a dispersion to reach a target coating amount.

Accordingly, the flow rate control apparatus and method for coating multi-division dual layers according to the present invention can stabilize a process of coating the electrode through a method of coating multi-division dual layers by adjusting amounts of the slurry for the rows through the valves while adjusting supply amounts of the slurry through the pumps, adjusting the pumps and the valves on the basis of flow rates measured by the flowmeters, and calculating opening degrees of the pumps and the valves to correspond to target coating amounts and can improve quality thereof by uniformly controlling coating amounts.

The present invention described in this specification can be implemented through, for example, a method, a process, an apparatus, a software program, a data stream, or a signal. Even when the present invention is described as being implemented in only a single form (e.g., as the method), the described features may be implemented in another form (e.g., as the apparatus or program). The apparatus may be implemented using proper hardware, software, firmware, or the like. For example, the method may be implemented in an apparatus such as a processor which generally refers to a processing device such as a computer, a microprocessor, an integrated circuit, and a programmable logic device. The processor includes a communication device such as a computer, a cell phone, a portable/personal digital assistant (PDA) terminal, and other devices which facilitate information communication between final users.

In such examples, the processor may be implemented as a CPU, system on chip (SoC), or the like, may drive an operating system or application to control a plurality of hardware or software components connected to the processor, and may perform various data processing and operations. The processor may be configured to execute at least one command stored in the memory and store result data of the execution in the memory.

According to the present invention, when an electrode of a secondary battery is coated, a flowmeter capable of measuring an actual flow rate is installed in each slot die through which a slurry is supplied, a coating amount of each of the slot dies in a plurality of rows of an upper layer and a lower layer is measured to adjust a supply amount of the slurry, and thus coating quality can be easily evaluated, and also the coating quality can be improved (e.g., increased).

According to the present invention, because a flow rate can be measured to check a coating amount in real time and a slurry is supplied in a plurality of rows using few pumps to perform a feedback-control according to flow rates, an electrode coating process can be stabilized.

According to the present invention, because the number of tanks and pumps for supplying a slurry is decreased to simplify the structure, the processes outlined above can be more easily performed, and the manufacturing cost can be reduced.

It should be understood that embodiments described herein should be considered in a descriptive sense and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims and equivalents thereof.

What is claimed is:

1. A flow rate control apparatus for coating multi-division dual layers, comprising:
   a plurality of slot dies organized into an upper layer and a lower layer, and configured to coat an electrode with a slurry;
   a pump configured to supply the slurry from a tank to each of the upper layer and the lower layer;
   a valve at the plurality of slot dies, and configured to divide the slurry supplied from the pump, and to supply the divided slurry to the plurality of slot dies;
   a flowmeter configured to measure a flow rate of the slurry supplied to the plurality of slot dies; and
   a processor configured to control the pump and the valve based on the flow rate of the slurry measured by the flowmeter to control a coating amount of the electrode.

2. The flow rate control apparatus of claim 1, wherein:
   the valve is provided as a plurality of valves;
   the slurry to be supplied to the upper layer is supplied through the pump to the plurality of slot dies of the upper layer; and
   the slurry to be supplied to the lower layer is supplied through the pump to the plurality of slot dies of the lower layer.

3. The flow rate control apparatus of claim 1, wherein the pump comprises:
   a first pump configured to supply the slurry accommodated in the tank to the upper layer; and
   a second pump configured to supply the slurry to the lower layer.

4. The flow rate control apparatus of claim 1, wherein:
   the processor is configured to receive the flow rate for each of the plurality of slot dies using the flowmeter and to compare a sum of flow rates for the upper layer and a sum of flow rates for the lower layer; and
   in response to a ratio between sums of the flow rates for the layers not reaching a target value, the processor is configured to control revolutions per minute (RPM) of the pump to adjust a supply amount of the slurry being supplied to any one of the upper layer and the lower layer.

5. The flow rate control apparatus of claim 1, wherein:
   the processor is configured to compare flow rates for the plurality of slot dies in the lower layer; and
   in response to there being a difference in flow rate for the plurality of slot dies between rows, the processor is configured to control the valve to reduce the difference in flow rate of the slurry for the plurality of slot dies.

6. The flow rate control apparatus of claim 1, further comprising a densitometer configured to measure a thickness of a coating amount of the electrode.

7. The flow rate control apparatus of claim 6, wherein, in response to the coating amount of the electrode measured by the densitometer not satisfying a target coating amount, the processor is configured to control the pump to adjust a supply amount of the slurry.

8. The flow rate control apparatus of claim 6, wherein:
   the processor is configured to calculate a difference in coating amount for the plurality of slot dies between rows measured using the densitometer; and
   in response to there being the difference in coating amount for the plurality of slot dies between the rows, the processor is configured to control the valve to adjust a flow rate of the slurry supplied to the plurality of slot dies.

9. The flow rate control apparatus of claim 1, wherein the processor is configured to calculate an average of flow rates for the plurality of slot dies of rows measured by the flowmeter, to calculate an amount of change by subtracting a target flow rate from an average value of the flow rates, and to set an amount of change in revolutions per minute (RPM) of the pump according to a range of the amount of change.

10. The flow rate control apparatus of claim 1, wherein the processor is configured to calculate a total average of flow rates measured by the flowmeter, to calculate a dispersion using values by subtracting flow rates of rows from the total average, and to adjust an opening degree of the valve according to a size of the dispersion.

11. A flow rate control method for coating multi-division dual layers, comprising:
   supplying, by a pump, a slurry for coating an electrode to an upper layer and a lower layer of a slot die from a tank;
   dividing, by a valve, the slurry supplied from the pump and supplying the divided slurry to a plurality of slot dies of the upper layer and the lower layer;
   measuring, by a flowmeter, flow rates of the slurry supplied to the plurality of slot dies; and
   changing, by a processor, a flow rate of the slurry supplied to any one of the plurality of slot dies by controlling at least any one of the pump and the valve based on the flow rates of the slurry measured by the flowmeter.

12. The flow rate control method of claim 11, wherein the supplying of the slurry comprises:
   supplying, by a first pump, the slurry accommodated in the tank to the upper layer; and
   supplying, by a second pump, the slurry to the lower layer.

13. The flow rate control method of claim 11, wherein the dividing of the slurry and supplying of the divided slurry comprises:
   dividing, by a valve installed at the upper layer, the slurry to be supplied to the upper layer and supplying the divided slurry to the plurality of slot dies provided in the upper layer; and
   dividing, by a valve installed at the lower layer, the slurry to be supplied to the lower layer and supplying the divided slurry to the plurality of slot dies provided in the lower layer.

14. The flow rate control method of claim 11, wherein the changing of the flow rate of the slurry comprises:
   receiving each of the flow rates for the plurality of slot dies through the flowmeter and comparing a sum of the flow rates for the upper layer and a sum of the flow rates for the lower layer;
   determining whether a ratio between the sums of the flow rates for the layers reaches a target value according to a comparison result; and
   controlling revolutions per minute (RPM) of the pump to adjust a supply amount of the slurry supplied to any one of the upper layer and the lower layer in response to the ratio between layers to the sum of the flow rates not reaching the target value.

15. The flow rate control method of claim 11, wherein the changing of the flow rate of the slurry comprises:
   comparing the flow rates for the plurality of slot dies at the lower layer; and
   controlling the valve to reduce a difference in flow rate of the slurry for the plurality of slot dies in response to there being the difference in flow rate between rows of the plurality of slot dies as a result.

16. The flow rate control method of claim 11, wherein the changing of the flow rate of the slurry comprises:
   calculating averages of the flow rates for the plurality of slot dies for rows measured by the flowmeter;
   calculating an amount of change by subtracting a target flow rate from average values of the flow rates; and
   setting an amount of change of revolutions per minute (RPM) of the pump according to a range of the amount of change.

17. The flow rate control method of claim 11, wherein the changing of the flow rate of the slurry comprises:
   calculating a total average of the flow rates measured by the flowmeter;
   calculating a dispersion using values calculated by subtracting flow rates for rows from the total average; and
   adjusting an opening degree of the valve according to a size of the dispersion.

18. The flow rate control method of claim 11, further comprising measuring, by a densitometer, a thickness of a coating amount for the electrode.

19. The flow rate control method of claim 18, further comprising:
   comparing, by the processor, the coating amount for the electrode measured by the densitometer and a target coating amount; and
   controlling, by the processor, the pump to adjust a supply amount of the slurry in response to the coating amount of the electrode not satisfying the target coating amount.

20. The flow rate control method of claim 18, further comprising:
   calculating, by the processor, a difference in coating amount between rows for the plurality of slot dies measured by the densitometer; and
   controlling, by the processor, the valve to adjust flow rates of the slurry supplied to the plurality of slot dies in response to there being a difference in coating amount between rows for the plurality of slot dies.

* * * * *